(12) United States Patent
Stang et al.

(10) Patent No.: US 10,974,904 B2
(45) Date of Patent: Apr. 13, 2021

(54) HARDENED COMPONENTS IN A CONVEYOR DRIVE SYSTEM

(71) Applicant: John Bean Technologies Corporation, Chicago, IL (US)

(72) Inventors: Scott E. Stang, Monroeville, OH (US); Owen Eugene Morey, Huron, OH (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 16/557,087

(22) Filed: Aug. 30, 2019

(65) Prior Publication Data

US 2020/0071085 A1 Mar. 5, 2020

Related U.S. Application Data

(60) Provisional application No. 62/726,039, filed on Aug. 31, 2018.

(51) Int. Cl.
*B65G 17/08* (2006.01)
*B65G 19/20* (2006.01)
*B65G 21/18* (2006.01)

(52) U.S. Cl.
CPC ........... *B65G 17/086* (2013.01); *B65G 19/20* (2013.01); *B65G 21/18* (2013.01); *B65G 2207/24* (2013.01)

(58) Field of Classification Search
CPC .. F16G 13/06; C23C 8/26; C23C 8/36; C23C 8/32; C21D 1/06; C21D 2211/008; C21D 2211/001; C21D 1/74; C21D 9/0087; B65G 19/20; B65G 23/14; B65G 23/16; B65G 21/18; B65G 17/166; B65G 17/168; B65G 17/086; B65G 2207/24; B65G 2207/44; F27B 9/24

See application file for complete search history.

(56) References Cited

U.S. PATENT DOCUMENTS 3,682,295 A * 8/1972 Roinestad .............. B65G 21/18
198/833
3,938,651 A 2/1976 Alfred et al.
4,899,871 A 2/1990 Olsson
(Continued)

FOREIGN PATENT DOCUMENTS

EP 1798168 A1 6/2007
EP 1855966 A1 11/2007

OTHER PUBLICATIONS

Extended European Search Report dated Feb. 6, 2020, issued in corresponding EP Application No. 19 19 4507.0, filed Aug. 30, 2019, 8 pages.

*Primary Examiner* — Mark A Deuble
(74) *Attorney, Agent, or Firm* — Christensen O'Connor Johnson Kindness PLLC

(57) ABSTRACT

In one embodiment of the present disclosure, a drive chain system (22, 24) for a spiral conveyor belt (34) includes inner (52) and outer (62) drive chains driving the spiral conveyor belt, the inner and outer drive chains each including a plurality of links (70) defined by a plurality of first (72) and second (74) pitches connected by linking pins (84, 86) extending through holes (80, 82) in the pitches, wherein at least a portion of the linking pins of at least one of the inner and outer drive chains are hardened and/or dissimilar linking pins which are harder on an outer surface than other components in the inner and outer drive chains.

20 Claims, 9 Drawing Sheets

(56) References Cited

U.S. PATENT DOCUMENTS

| | | | | |
|---|---|---|---|---|
| 5,803,232 | A | 9/1998 | Froderberg | |
| 6,068,568 | A * | 5/2000 | Kozakura | B21L 9/04 474/212 |
| 6,582,765 | B2 * | 6/2003 | Wang | C23C 12/02 427/216 |
| 2003/0192299 | A1 * | 10/2003 | Kaga | F16G 13/06 59/5 |
| 2004/0018905 | A1 * | 1/2004 | Okabe | F16G 13/06 474/231 |
| 2004/0244177 | A1 * | 12/2004 | Hartman | B65G 17/086 29/434 |
| 2007/0032325 | A1 * | 2/2007 | Shimaya | F16G 13/04 474/213 |
| 2007/0254760 | A1 * | 11/2007 | Murakami | F16G 13/06 474/231 |
| 2008/0015072 | A1 * | 1/2008 | Nagao | F16G 13/06 474/206 |
| 2008/0099108 | A1 | 5/2008 | Baudis et al. | |
| 2008/0280716 | A1 * | 11/2008 | Miyazawa | F16G 13/06 474/206 |
| 2011/0308227 | A1 * | 12/2011 | Hahn | F16G 13/06 59/8 |
| 2013/0203539 | A1 * | 8/2013 | Kirchner | C22C 38/002 474/228 |
| 2017/0234404 | A1 | 8/2017 | Ludecke et al. | |
| 2018/0031033 | A1 * | 2/2018 | Lavigno, IV | B65G 17/40 |

* cited by examiner

HARDENED COMPONENTS IN A CONVEYOR DRIVE SYSTEM

CROSS-REFERENCE TO RELATED APPLICATION

This application claims the benefit of U.S. Provisional Application No. 62/726,039, filed Aug. 31, 2018, the entire contents of which are expressly incorporated herein by reference.

BACKGROUND

In spiral stacking conveyor belt system as used in thermal processing applications, including cooking and freezing applications, inner and outer drive chain wear elongation is a cause of regular maintenance for the conveyor systems. In some systems, the outer drive chain wears more than the inner drive chain. Chain wear, as well as a lack of synchronization in chain wear, can result in increased maintenance schedules and potential damage to the systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a spiral conveyor belt system is provided. The system includes: a spiral conveyor belt; and inner and outer drive chains driving the spiral conveyor belt, the inner and outer drive chains each including a plurality of links defined by a plurality of first and second pitches connected by linking pins extending through holes in the pitches, wherein at least a portion of the linking pins of at least one of the inner and outer drive chains are hardened and/or dissimilar linking pins which are harder on an outer surface than other components in the inner and outer drive chains.

In accordance with another embodiment of the present disclosure, a drive chain system for a spiral conveyor belt is provided. The drive chain system includes inner and outer drive chains driving the spiral conveyor belt, the inner and outer drive chains each including a plurality of links defined by a plurality of first and second pitches connected by linking pins extending through holes in the pitches, wherein at least a portion of the linking pins of at least one of the inner and outer drive chains are hardened and/or dissimilar linking pins which are harder on an outer surface than other components in the inner and outer drive chains.

In any of the embodiments described herein, the outer surfaces of the linking pins may have a hardness greater than 400 HV, greater than 450 HV, or greater than 500 HV.

In any of the embodiments described herein, the hardened linking pins may be made from austenitic stainless steel having outer surfaces which have been hardened by carbon or nitrogen type atoms introduced into the austenitic stainless steel over a predetermined depth.

In any of the embodiments described herein, the hardened linking pins may be made from PH martensitic stainless steel.

In any of the embodiments described herein, the predetermined depth may be between 5 and 40 microns.

In any of the embodiments described herein, the second pitches may include bushings for receiving the linking pins made from austenitic stainless steel and wherein at least a portion of the bushings have surfaces which are hardened and/or dissimilar surfaces which are harder than the other components in the inner and outer drive chains.

In any of the embodiments described herein, the hardened surfaces of the bushings may have a hardness greater than 400 HV, greater than 450 HV, or greater than 500 HV.

In any of the embodiments described herein, the hardened bushings pins may be made from austenitic stainless steel having outer surfaces which have been hardened by carbon or nitrogen type atoms introduced into the austenitic stainless steel over a predetermined depth.

In any of the embodiments described herein, wherein the hardened bushings may be made from PH martensitic stainless steel.

In any of the embodiments described herein, wherein the predetermined depth may be between 5 and 40 microns.

In any of the embodiments described herein, the inner and outer drive chains may be ball drive chains or roller drive chains.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions or specific references.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

Figure 1:
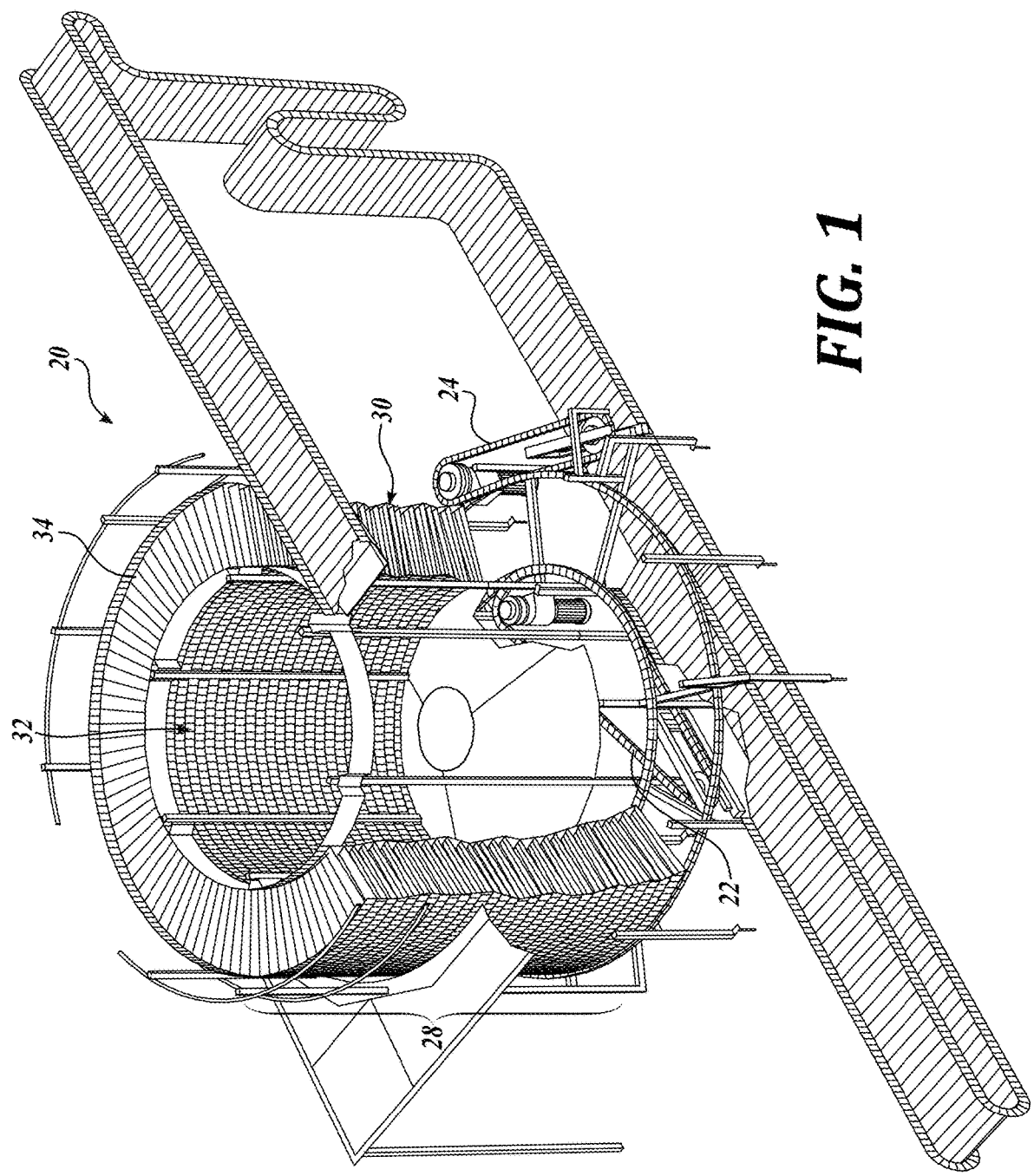
FIG. 1 is an isometric view of a spiral stacking conveyor belt system including a self-stacking conveyor belt and a drive system for driving the conveyor belt in accordance with embodiments of the present disclosure.
Figure 2:
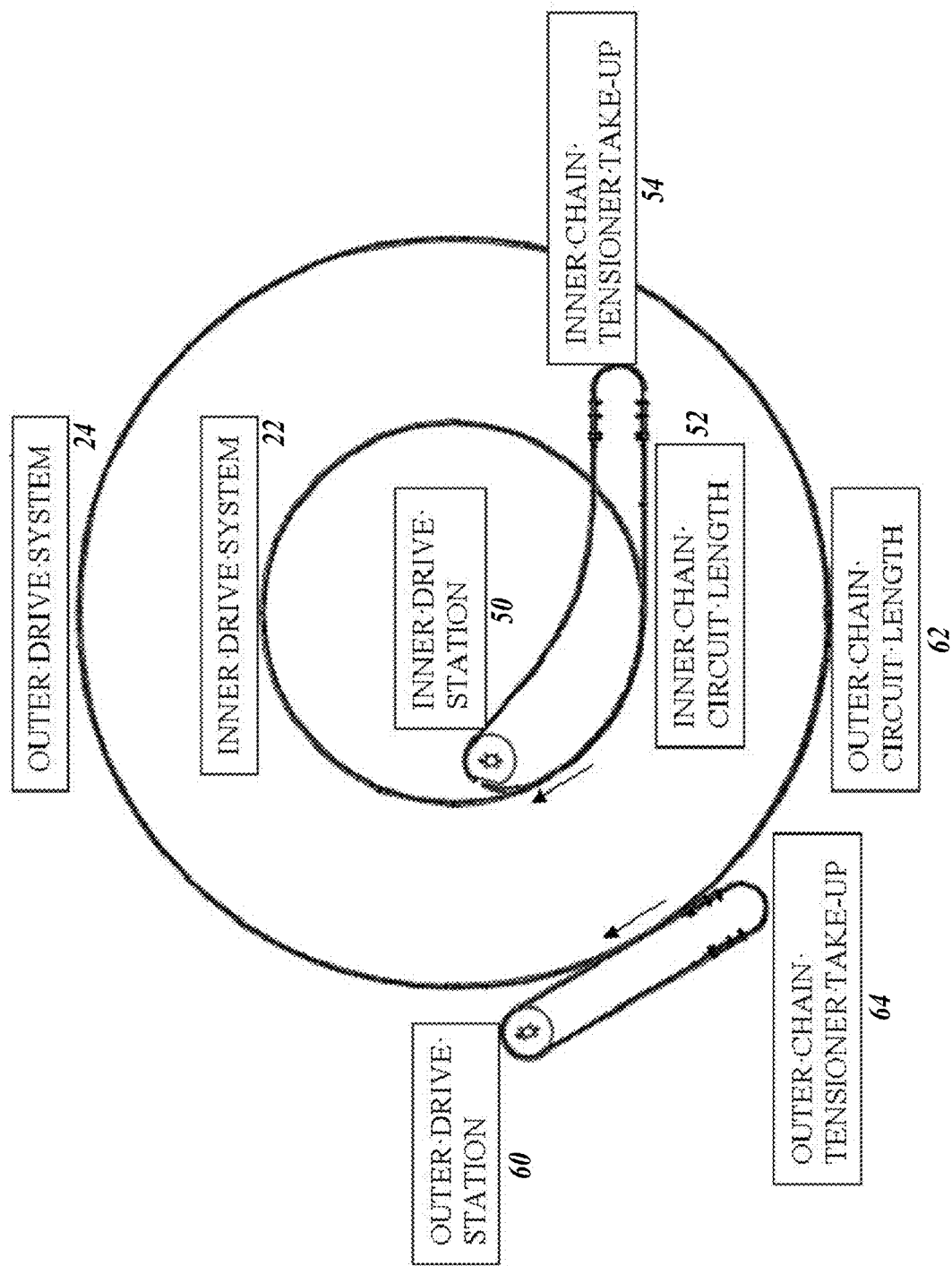
FIG. 2 is a top view of the spiral stacking conveyor belt system of FIG. 1 showing the inner and outer dive chains of the drive system.
Figure 3:
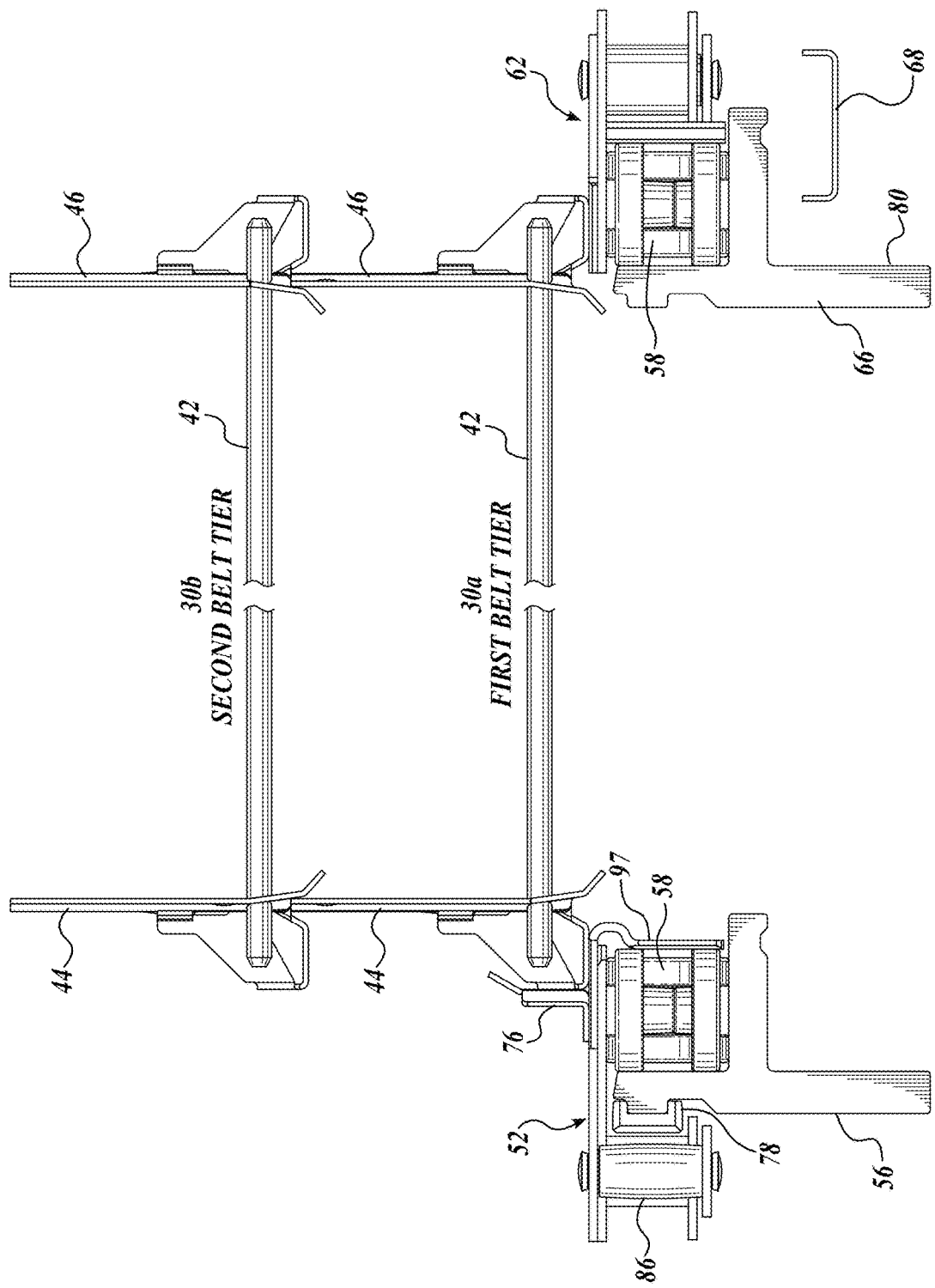
FIG. 3 is a cross-sectional side view of the spiral stacking conveyor belt system of FIG. 1 showing the inner and outer dive chains (roller chains) of the drive system.

Referring to FIGS. 1-3, embodiments of the present disclosure are directed to spiral stacking conveyor belt systems 20 driven by inner and outer drive systems 22 and 24 and components thereof. The inner and outer drive systems 22 and 24 are generally manufactured from stainless steel components for corrosion resistance. In accordance with embodiments of the present disclosure, the system includes hardened stainless steel components to reduce the elongation of the drive chains over extended periods of use. In accordance with other embodiments of the present disclosure, the system includes hardened and/or dissimilar stainless steel components to reduce galling in the drive chains.

Suitable embodiments of spiral stacking conveyor belts are shown and described in U.S. Pat. No. 3,938,651, issued to Alfred et al., and U.S. Pat. No. 5,803,232, issued to Frodeberg, the disclosures of which are hereby expressly incorporated by reference. However, it should be appreciated that other suitable spiral belt assemblies are also within the scope of the present disclosure.

Referring to FIG. 1, when formed as a spiral stack 26, the pervious conveyor belt 34 (see close-up perspective view in FIG. 4) is configured into a plurality of superimposed tiers 30 that are stacked on top of each other (i.e., known in the art as "self-stacking" conveyor belt). In that regard, each tier 30 of the stack 26 forms a pervious annulus, through which gaseous cooking or cooling medium may travel, whether for cooking or freezing systems. When formed in a spiral stack 26, the plurality of tiers 30 creates an inner cylindrical channel 32, through which the gaseous medium may also travel. Workpieces (such as food products) travel on the conveyor belt 34 and are affected (either cooked or frozen) by gaseous medium in the cooking or freezing chamber. Exemplary spiral stacks 22 may have any number of tiers 30, typically in the range of about 8 to about 25 tiers.

Figure 4:
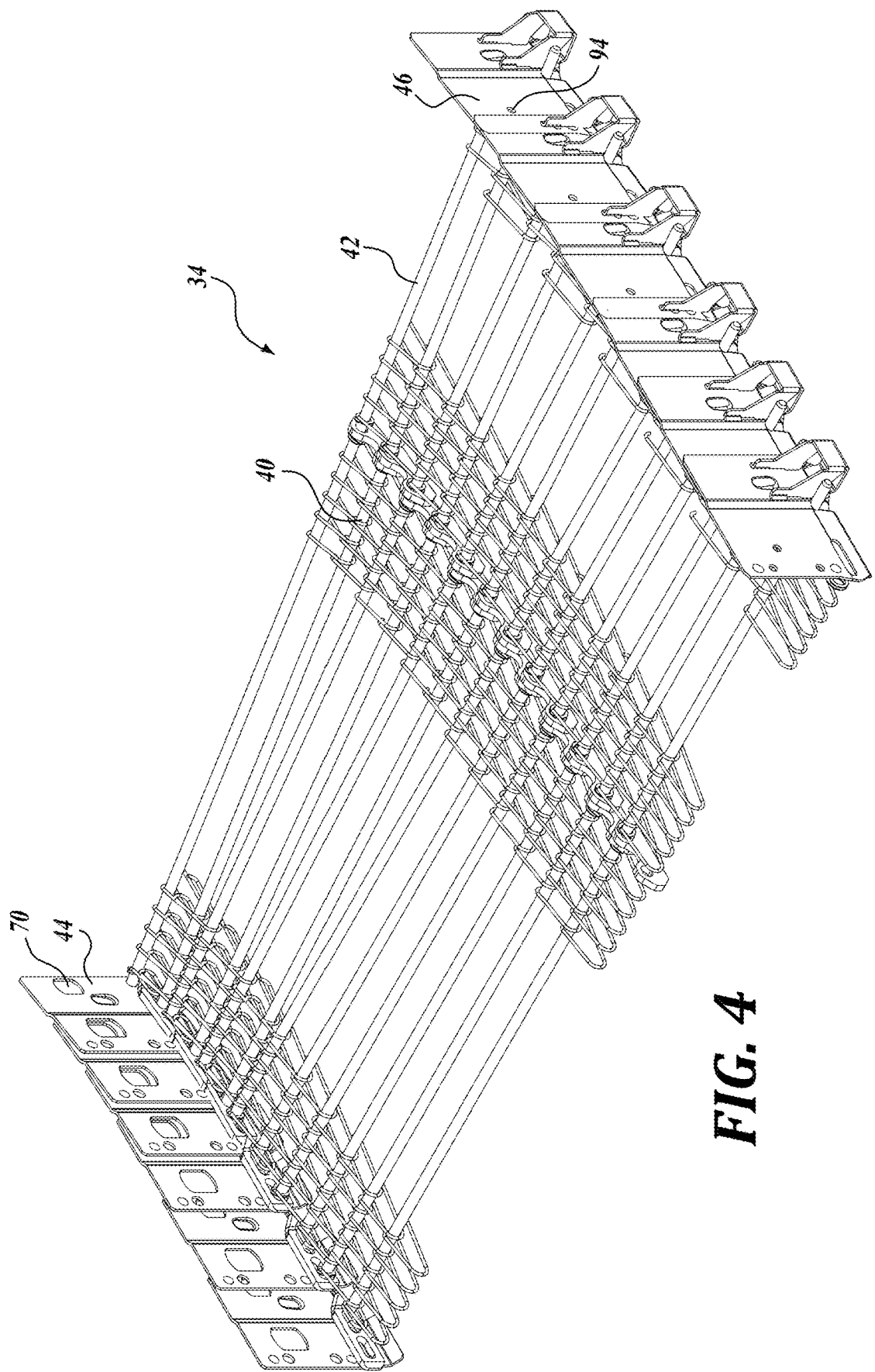
FIG. 4 is an isometric view of a portion of the conveyor belt in the spiral stacking conveyor belt system of FIG. 1.

Referring to FIG. 4, as a non-limiting example, the conveyor belt 34 may be in the form of a pervious belt mesh 40 for conveying workpieces and formed by transverse rods 42 interconnected by intermediate links, as well as inner and outer links 44 and 46 at the ends of the transverse rods 42. The inner and outer links 44 and 46 are configured to enable spiral stacking for the belt tiers 30 and for interaction with the drive system (see FIG. 3). When the conveyor belt 34 is configured as a spiral stack 26, gaseous medium may travel in a substantially vertical direction through the pervious belt mesh 40 of each superimposed tier 30.

Referring to FIGS. 2 and 3, the conveyor belt 34 in the illustrated embodiment of FIG. 1 is driven by a drive system including inner and outer drive systems 22 and 24. As seen in FIG. 2, the inner drive system 22 includes an inner drive station 50, an inner drive chain 52, and an inner chain tensioner take up 54. The outer drive system 24 includes an outer drive station 60, an outer drive chain 62, and an outer chain tensioner take up 64.

Referring to FIG. 3, the inner drive chain 52 is supported by an inner rail 56 and the outer drive chain 62 is supported by an outer rail 66. The inner and outer rails 56 and 66 also may include optional drip plates. For example, see the outer rail drip plate 68.

In the illustrated embodiment, the inner and outer drive chains 52 and 62 are roller chains. Therefore, when driven, rollers 58 enable movement of the inner and outer drive chains 52 and 62 along the inner and outer rails 56 and 66. Ball chains are also within the scope of the present disclosure, for example, as described in U.S. Pat. No. 4,899,871, the disclosure of which is expressly incorporated by reference herein.

As seen in FIG. 3, the inner and outer links 44 and 46 of the conveyor belt 34 interact with and are driven by the respective inner and outer drive systems 22 and 24.

Figure 5:
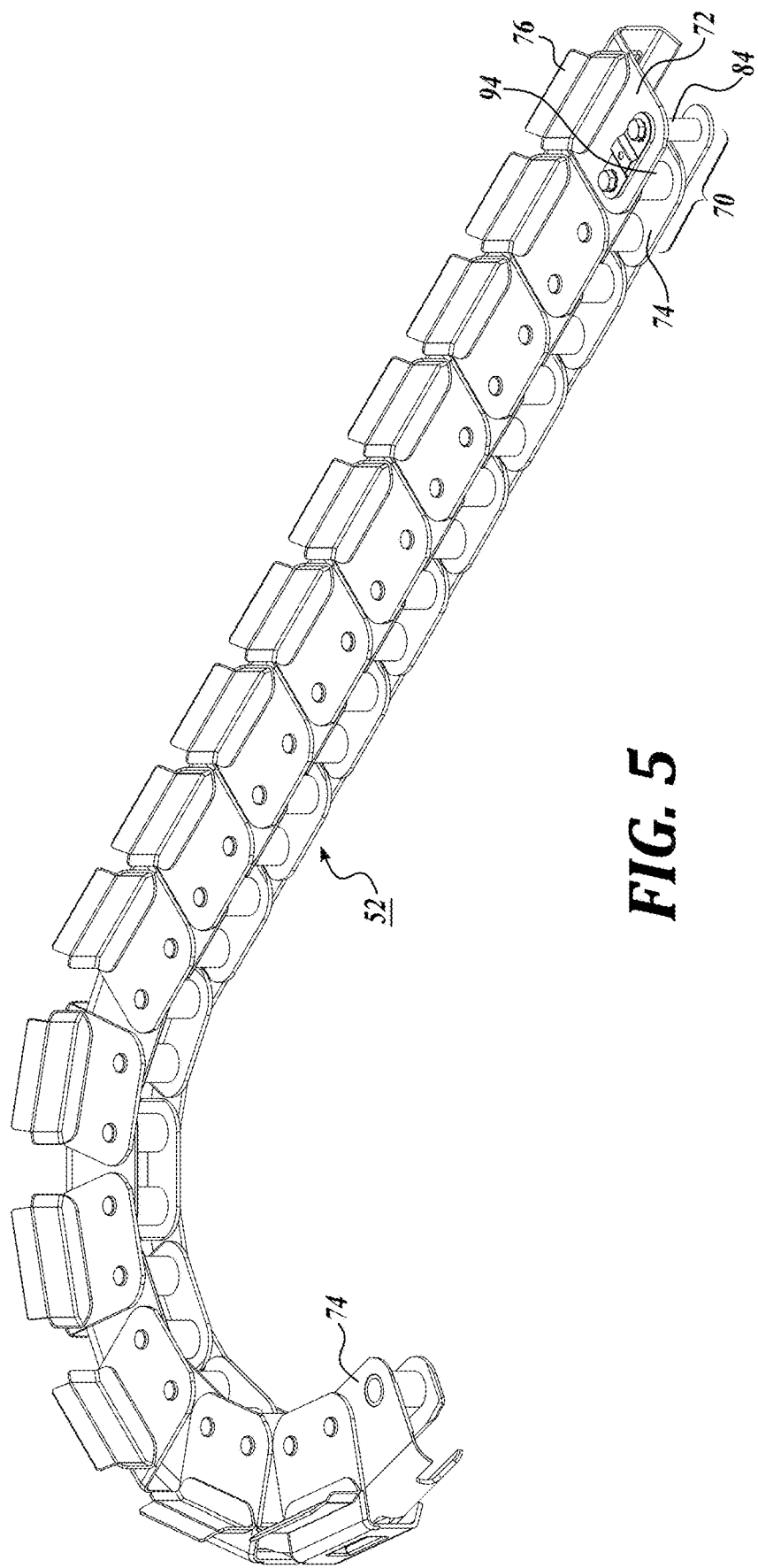
FIG. 5 is an isometric view of a portion of a drive chain (roller chain) in accordance with embodiments of the present disclosure.
Figure 6:
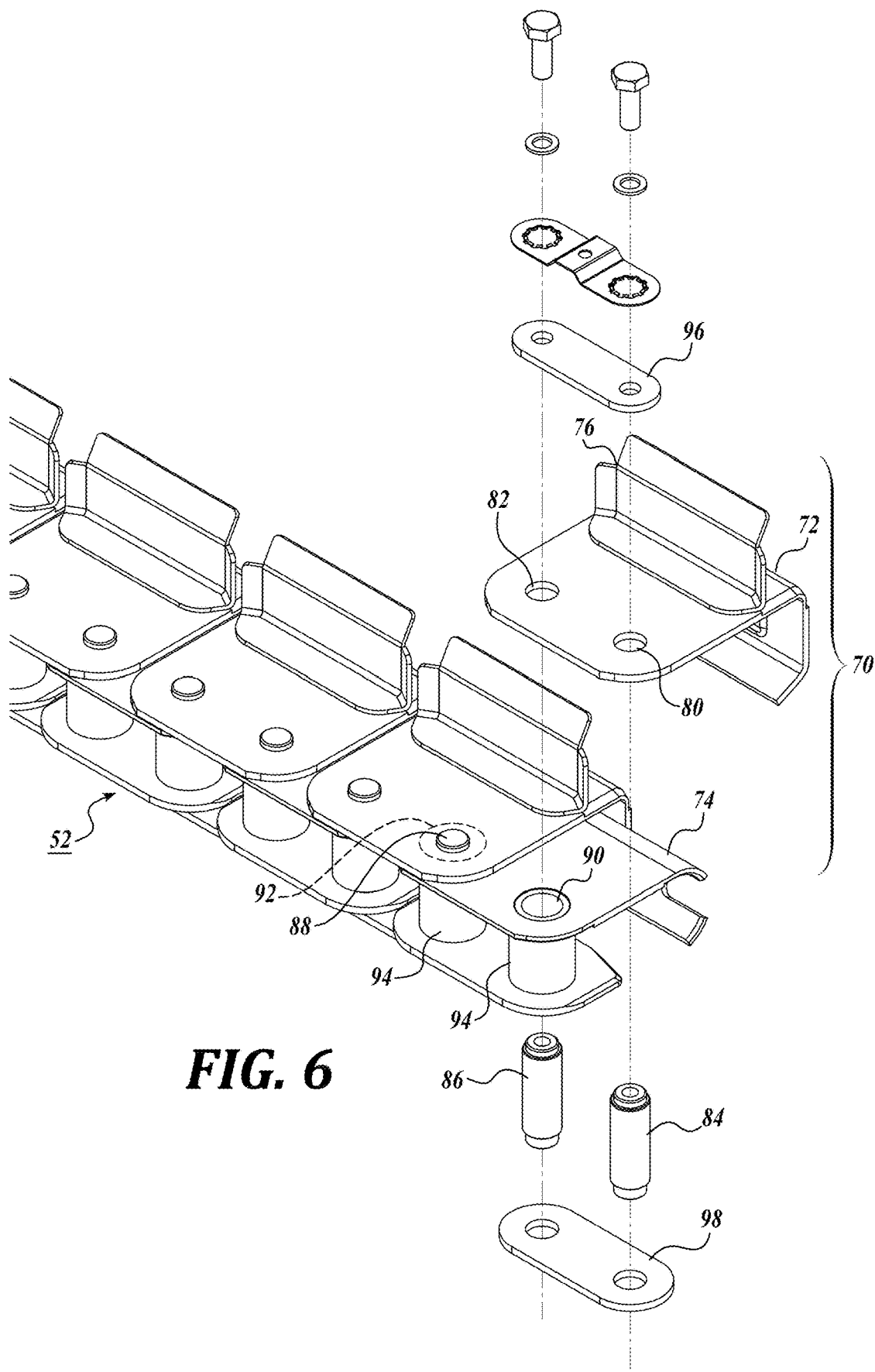
FIG. 6 is an exploded view of a portion of the drive chain of FIG. 5.

Referring to FIGS. 5 and 6, the inner drive chain 52 will be described in greater detail. The inner drive chain 52 is made up of a plurality of links 70 including first and second pitches 72 and 74 at the top side of the links. The first pitch 72 includes an upwardly extending flange 76 for interaction with the first tier 30a of the conveyor belt (see FIG. 3). The first and second pitches 72 and 74 are coupled to one another so as to enable coupling with adjacent links.

The first pitch 72 includes two adjacent holes 80 and 82 for receiving coupling pins 84 and 86. The second pitch 74 includes two adjacent holes 90 and 92 for receiving second and third coupling pins 86 and 88. The second pitch 74 may include bushings 94 for receiving the second and third coupling pins 86 and 88. At the bottom side of link 70 an inner plate 95 extends between the bottom of pins 88 and 90 to correspond to the span of the second pitch 74.

In the illustrated embodiment, upper and lower plates 96 and 98 reinforce the coupling between links 70. The first and second pitches 72 and 74 when assembled define the upper structure of a link 70 which can be linked to adjacent links to define the inner drive chain 52.

Referring to FIG. 3, the outer drive chain 62 is substantially similar to the inner drive chain 52 except for differences regarding a glide strip 78 and the upward extending flange 76 only on the inner drive chain 52.

As mentioned above, elongation wear of the inner and outer drive chains 52 and 62 is a cause of regular maintenance for the spiral stacking conveyor belt system. In addition, when the outer drive chain wear 62 elongates at a faster rate than the inner drive chain 52, increased maintenance is required and potential damage to the system may result.

In chain wear elongation, pitch length increases as pins and bushings apply tension forces to each other and oscillate against each other. Toward the end of a chain service life, the physical elongation from pin-bushing wear can be as much as 3% of assembled chain length. Other wear in the system in addition to wear in the pins and bushings is seen is in rail path, chain, sprocket, and idler wear depths. Over time, to adjust for wear elongation in the chain, pitches of chain are removed in two-pitch links to accommodate chain construction and stoke length.

Differences in inner and outer chain wear is problematic because a 3% elongated chain runs 3% faster in speed compared to a new articulating chain on the same drive sprocket and at the same rotation rate. Some spiral conveyor systems can accommodate small differences in chain elongation and speed, for example, a 1% difference in chain elongation and speed. The greater the differential wear between the inner and outer drives, the greater driving force imbalance on the belt stack by the more heavily wear elongated chain. After a certain amount of elongation of the outer drive chain 62 compared to the inner drive chain 52, the system may be driven primarily by the outer drive chain 62, which can result in accelerated elongation and eventual system failure, as described in Example 3 with reference to FIG. 8 below.

Figure 7A:
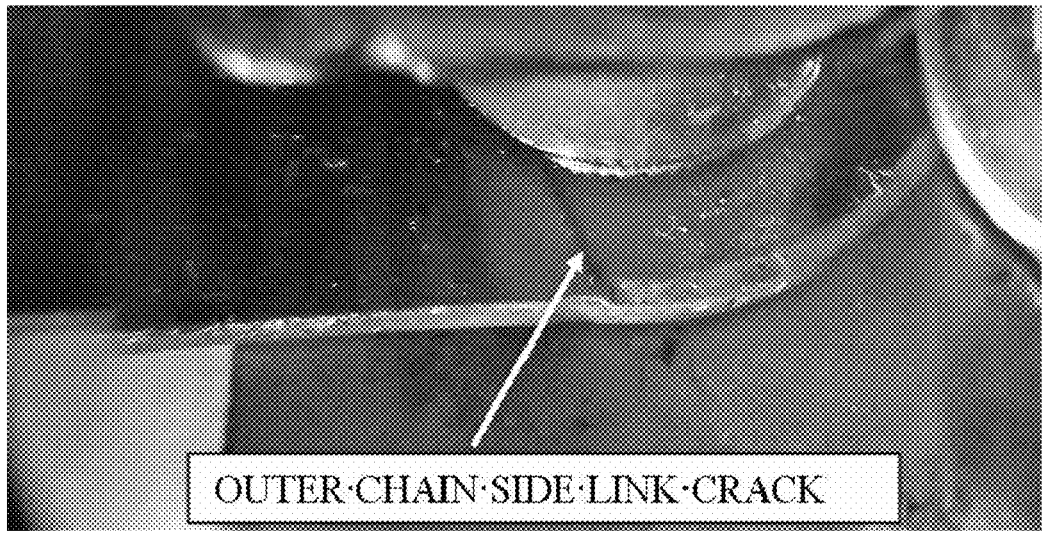
FIGS. 7A-7C are photographs of actual drive chain wear.
Figure 7B:
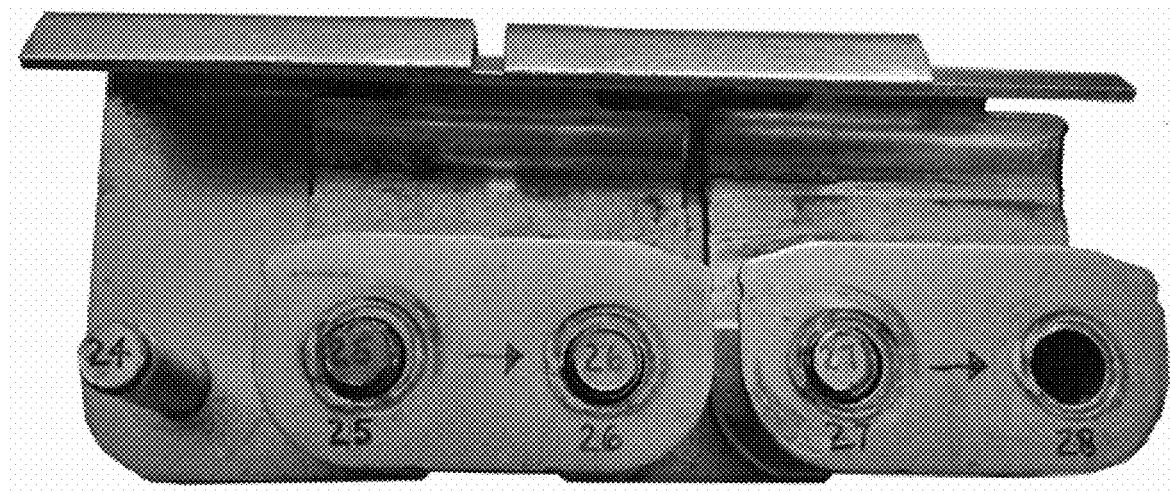
Figure 7C:
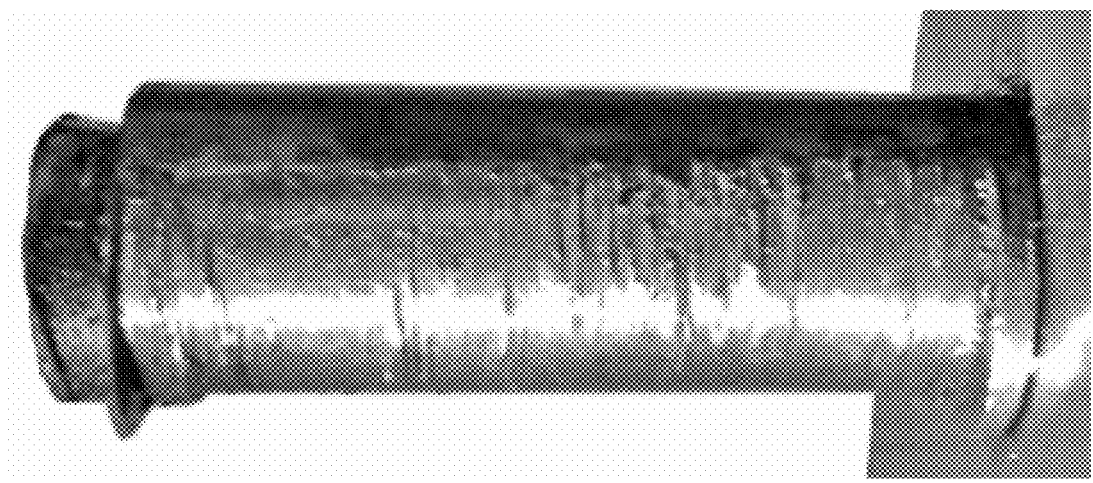

Referring to FIGS. 7A, 7B, and 7C, photographs of work chain links are provided. Referring to FIG. 7A, a photograph of an outer chain side link fatigue crack is shown as a result of high outer chain tension. Referring to FIG. 7B, a worn chain sample photograph is provided, as described in greater detail below in Example 2. Referring to FIG. 7C, a worn pin photograph is provided. In the pin and bushing assembly, pins seem to wear at a faster rate than bushings. As described below in Example 2, pin wear in this non-limiting example accounts for about 95% of total wear elongation from the pin and bushing assembly, and bushing wear accounts for about 5% of the total wear elongation from the pin and bushing assembly.

Example 1: Chain Elongation Problem

Observed a problem situation in which 12.5 inches of outer drive chain slip advance under the conveyor belt feed with the inner drive retarded negative (belt was going faster than the inner drive chain). Outer chain wear elongation was 1092 mm or 2.8% while the inner chain elongation was 1062 mm or 0% (essentially new chain). When a new (unworn) outer chain was installed, the drive system returned to a normal running condition.

Example 2: Pin and Bushing Wear

Referring to FIG. 7B, four pins are identified as 24, 25, 26, and 27, and four bushings are identified as 25, 26, 27, and 28. Data is provided below in Table 1 based on wear measured on actual parts for the pins and the corresponding bushings.

TABLE 1

PIN AND BUSHING ACTUAL WEAR.

| | Pin outer diameter (mm) | | | Bushing outer diameter (mm) | | |
| --- | --- | --- | --- | --- | --- | --- |
| | Unworn | Worn | Delta | Unworn | Worn | Delta |
| 24 | 12.03 | 11.76 | 0.27 | | | |
| 25 | 12.01 | 10.42 | 1.59 | 12.61 | 12.66 | 0.05 |
| 26 | 12.02 | 11.13 | 0.89 | 12.61 | 12.70 | 0.09 |
| 27 | 12.02 | 10.75 | 1.27 | 12.60 | 12.65 | 0.05 |
| 28 | | | | 12.62 | 12.69 | 0.07 |

Example 3: Chain Wear Elongation Acceleration

Figure 8:
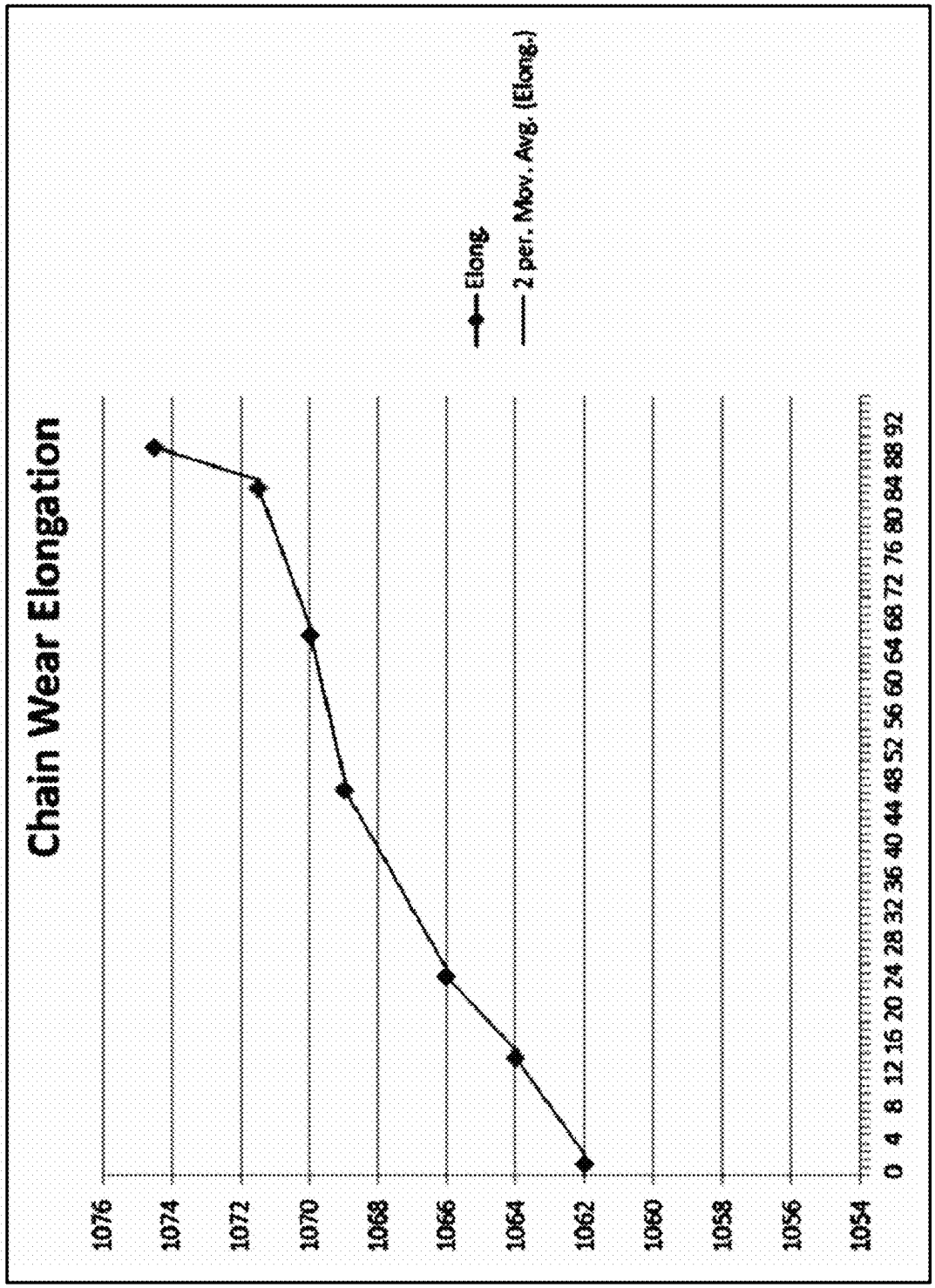
FIG. 8 is a graphical illustration of actual chain wear elongation data.

Referring to FIG. 8, chain wear elongation in chain length (mm) is illustrated over 88 days. Elongation is at a substantially linear rate up until day 84. After day 84, elongation is accelerated. It is believed after day 84, there is a greater driving force imbalance on the belt stack by the more heavily wear elongated chain (the outer chain) causing chain wear elongation to accelerate.

To mitigate chain wear elongation, embodiments of the present disclosure includes systems including hardened stainless steel components to reduce the elongation of the drive chains over extended periods of use.

In addition to chain wear elongation, galling, sometimes called cold welding, can also be a problem in drive chains. Galling is a form of severe adhesive wear which can occur when two metal surfaces are in relative motion to each other and under heavy pressure. Stainless steel components are susceptible to galling. When the two surfaces are the same material, these exposed surfaces can easily fuse together. Separation of the two surfaces can result in surface tearing and even complete seizure of metal components.

A galling threshold can be increased by the use of dissimilar materials (bronze against stainless steel), or using different stainless steels (martensitic against austenitic). Lubrication can help reduce the risks of galling. Also, high hardness for certain parts can reduce the risks of galling.

To increase the galling threshold and mitigate the risk of galling, embodiments of the present disclosure includes systems including hardened and/or dissimilar stainless steel components to mitigate the risk of galling.

In food processing applications, corrosion resistant steel is generally used for manufacturing assemblies. Corrosion resistant stainless steel is generally understood to refer to an iron material with at least 13% by weight of chromium added by an alloying process.

Austenitic Stainless Steel

Austenitic stainless steel is a group of stainless steel alloys classified by a crystalline structure having austenite as it primary crystalline structure (face centered cubic). An austenite crystalline structure is achieved by sufficient additions of the austenite stabilizing elements nickel, manganese and nitrogen. Due to their crystalline structure, austenitic steels are not hardenable by heat treatment and are essentially non-magnetic.

There are two subgroups of austenitic stainless steel. 300 series stainless steels achieve their austenitic structure primarily by a nickel addition while 200 series stainless steels substitute manganese and nitrogen for nickel, though there is still a small nickel content. Type 316 is a common austenitic stainless steel, which contains some molybdenum to promote resistance to acids and increase resistance to localized attack (e.g. pitting and crevice corrosion). The higher nitrogen addition in 200 series gives them higher mechanical strength than 300 series.

Because austenitic steel cannot be hardened by heat treatment, a process for manufacturing hardened components according to one embodiment of the present disclosure includes the acquiring the component (which may be stamped from an austenitic stainless steel strip) and treating the surfaces of the component. Treatment includes diffusing reinforcing atoms of carbon and/or nitrogen into the crystal lattice of the steel over a predetermined depth, preferably between 5 and 40 microns inclusive.

One suitable treatment may include subjecting the component to molten salt bath treatment, such as a Kolsterisation® treatment, as described in U.S. Pat. No. 7,909,943, issued Mar. 22, 2011, the disclosure of which is expressly incorporated herein by reference.

In the structure of austenitic stainless steel (a cubical face-centered lattice), Non-metal elements such as nitrogen and carbon can be present in a solid solution. If carbon or nitrogen or both elements are successfully diffused into the surface of an austenitic stainless steel and are kept there in a solid saturated or even over-saturated solution, then two effects will occur:

(a) If carbon is diffused in below the chromium carbide forming temperature (420-440° C.) and nitrogen is diffused in below the chromium nitride forming temperature (350-370° C.), no carbides or nitrides of the chromium will form. As a result, no chromium is extracted from the alloy matrix in the region of the diffusion layer and the corrosion resistance of the stainless steel is preserved.

(b) The diffused-in elements expand the austenitic lattice and result in high compressive stress in the diffusion zone, which in turn leads to a considerable increase in the hardness. In scientific literature, this is referred to as expanded austenite or S-phase, which can have a hardness of up to 1000 HV on the Vickers scale. Typical 300-series stainless steel has a hardness of 300-400 HV.

Other suitable treatments may include a gas treatment, a thermochemical treatment such as a case hardening, a nitridation, a nitrocarburization, an ion implantation, a diffusion heat treatment, etc.

Treatment is selected to obtain a hardening of the treated surfaces to a hardness selected from the group consisting of greater than 400 HV, greater than 450 HV, and greater than 500 HV.

Martensitic Stainless Steel

Martensitic stainless steel is another group of stainless steel alloys having a wide range of properties and used as stainless engineering steels, which can be heat treated to provide the adequate level of mechanical properties. The heat treatment typically involves three steps. Austenitizing heats the steel to a temperature in the range 980-1050° C., depending on the grade. The austenite is a face centered cubic phase. Quenching (a rapid cooling in air, oil or water) transforms the austenite into martensite, a hard a body-centered tetragonal crystal structure. The as-quenched martensite is very hard and too brittle for most applications. Some residual austenite may remain. Tempering (i.e. heating around 500° C., holding at temperature, then air cooling) increases the tempering temperature decreases the Yield and Ultimate tensile strength but increases the elongation and the impact resistance.

In martensitic types, there is a subgroup of Precipitation Hardening grades: Grade EN 1.4542 (a.k.a 17/4PH), which combines martensitic hardening and precipitation hardening. PH martensitic stainless steel achieves high strength and good toughness, and corrosion resistance similar to that of austenitic stainless steel.

In accordance with embodiments of the present disclosure, the inner and/or outer drive chains 52 and 62 may include one or more hardened and/or dissimilar components to reduce the wear elongation or galling of the drive chains. In one embodiment, the inner and/or outer drive chains 52 and 62 may include pins that are either hardened and/or dissimilar from the other components in the drive chains 52 and 62. In another embodiment, the inner and/or outer drive chains may include hardened and/or dissimilar bushings in lieu of hardened and/or dissimilar pins or in addition to hardened and/or dissimilar pins. In another embodiment of the present disclosure, the outer drive chain 62 may include one or more hardened and/or dissimilar components, which the inner drive chain 52 may include no hardened and/or dissimilar components or different hardened and/or dissimilar components to try to accommodate differences in inner and outer drive chain wear.

As a non-limiting example, some components are made from PH martensitic stainless steel having a hardness of 40-44 Rc hardness (385-435 HV hardness), which is then subjected to a hardening treatment process that takes the particle hardness on the surface up over 60 Rc (746 HV).

In some embodiments of the present disclosure, some components of the drive system are made from hardened PH martensitic stainless steel having a hardness of greater than 400 HV, greater than 450 HV, and greater than 500 HV.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A spiral conveyor belt system, comprising:
a spiral conveyor belt;
inner and outer drive chains driving the spiral conveyor belt, the inner and outer drive chains each including a plurality of links defined by a plurality of first and second pitches connected by stainless steel linking pins extending through holes in the pitches, wherein at least a portion of the linking pins of at least one of the inner and outer drive chain is hardened and/or composed of material dissimilar from the pitches, and which is harder on an outer surface of the linking pins than the pitches; and
wherein the links comprise bushings structurally separate from the first and second pitches for receiving the linking pins, the bushings made from stainless steel.

2. The system of claim 1, wherein the outer surfaces of the linking pins have a hardness greater than 400 HV, greater than 450 HV, or greater than 500 HV.

3. The system of claim 1, wherein the linking pins are made from austenitic stainless steel having outer surfaces which have been hardened by atoms introduced into the austenitic stainless steel over a predetermined depth, the atoms selected from the group consisting of carbon type atoms and nitrogen type atoms.

4. The system of claim 3, wherein the predetermined depth is between 5 and 40 microns.

5. The system of claim 1, wherein the linking pins are made from martensitic stainless steel.

6. The system of claim 1, wherein the inner and outer drive chains are ball drive chains or roller drive chains.

7. The system of claim 1, wherein at least a portion of the bushings are selected from the group having surfaces which are hardened and having dissimilar surfaces which are harder than other components of the inner and outer drive chains.

8. The system of claim 7, wherein the hardened surfaces of the bushings have a hardness greater than 400 HV, greater than 450 HV, or greater than 500 HV.

9. The system of claim 7, wherein the bushings are made from austenitic stainless steel having outer surfaces which have been hardened by carbon or nitrogen atoms introduced into the austenitic stainless steel over a predetermined depth.

10. The system of claim 9, wherein the predetermined depth is between 5 and 40 microns.

11. A spiral conveyor belt system, comprising:
a spiral conveyor belt;
inner and outer drive chains driving the spiral conveyor belt, the inner and outer drive chains each including a plurality of links defined by a plurality of first and second pitches connected by stainless steel linking pins extending through holes in the pitches, wherein at least a portion of the linking pins of at least one of the inner and outer drive chain is hardened and/or composed of material dissimilar from the pitches, and which is harder on an outer surface of the linking pins than the pitches;
wherein the links comprise bushings for receiving the linking pins, the bushings made from stainless steel; and
wherein the bushings for receiving the linking pins are made from austenitic stainless steel.

12. A spiral conveyor belt system, comprising:
a spiral conveyor belt;
inner and outer drive chains driving the spiral conveyor belt, the inner and outer drive chains each including a plurality of links defined by a plurality of first and second pitches connected by stainless steel linking pins extending through holes in the pitches, wherein at least a portion of the linking pins of at least one of the inner and outer drive chain is hardened and/or composed of material dissimilar from the pitches, and which is harder on an outer surface of the linking pins than the pitches;
wherein the links comprise bushings for receiving the linking pins, the bushings made from stainless steel; and
wherein the bushings are made from martensitic stainless steel.

13. A drive chain system for a spiral conveyor belt, the drive chain system comprising:
inner and outer drive chains driving the spiral conveyor belt, the inner and outer drive chains each comprising a plurality of links defined by a plurality of first and second pitches connected by linking pins extending through holes in the pitches, wherein at least a portion of the linking pins of at least one of the inner and outer drive chain is hardened and/or composed of material dissimilar from the pitches, and which is harder on an outer surface of the linking pins than the pitches; and
wherein the links comprise bushings structurally separate from the first and second pitches for receiving the linking pins made from stainless steel.

14. The system of claim 13, wherein the outer surfaces of the linking pins have a hardness greater than 400 HV, greater than 450 HV, or greater than 500 HV.

15. The system of claim 13, wherein the linking pins are made from austenitic stainless steel having outer surfaces which have been hardened by carbon or nitrogen atoms introduced into the austenitic stainless steel over a predetermined depth.

16. The system of claim 13, wherein the linking pins are made from martensitic stainless steel.

17. A drive chain system for a spiral conveyor belt, the drive chain system comprising:
inner and outer drive chains driving the spiral conveyor belt, the inner and outer drive chains each comprising a plurality of links defined by a plurality of first and second pitches connected by linking pins extending through holes in the pitches, wherein at least a portion of the linking pins of at least one of the inner and outer drive chain is hardened and/or composed of material dissimilar from the pitches, and which is harder on an outer surface of the linking pins than the pitches; and
wherein the links comprise bushings for receiving the linking pins made from stainless steel; and
wherein the bushings for receiving the linking pins are made from austenitic stainless steel.

18. A drive chain system for a spiral conveyor belt, the drive chain system comprising:
inner and outer drive chains driving the spiral conveyor belt, the inner and outer drive chains each comprising a plurality of links defined by a plurality of first and second pitches connected by linking pins extending through holes in the pitches, wherein at least a portion of the linking pins of at least one of the inner and outer drive chain is hardened and/or composed of material dissimilar from the pitches, and which is harder on an outer surface of the linking pins than the pitches; and
wherein the links comprise bushings for receiving the linking pins made from stainless steel;
wherein at least a portion of the bushings have surfaces which are hardened; and
wherein the hardened surfaces of the bushings have a hardness greater than 400 HV, greater than 450 HV, or greater than 500 HV.

19. The system of claim 18, wherein the bushings are made from austenitic stainless steel having outer surfaces which have been hardened by carbon or nitrogen atoms introduced into the austenitic stainless steel over a predetermined depth.

20. A drive chain system for a spiral conveyor belt, the drive chain system comprising:
inner and outer drive chains driving the spiral conveyor belt, the inner and outer drive chains each comprising a plurality of links defined by a plurality of first and second pitches connected by linking pins extending through holes in the pitches, wherein at least a portion of the linking pins of at least one of the inner and outer drive chain is hardened and/or composed of material dissimilar from the pitches, and which is harder on an outer surface of the linking pins than the pitches; and
wherein the links comprise bushings for receiving the linking pins made from stainless steel; and
wherein the bushings are made from martensitic stainless steel.

* * * * *